US011198758B2

United States Patent
Ito et al.

(10) Patent No.: US 11,198,758 B2
(45) Date of Patent: Dec. 14, 2021

(54) AROMATIC POLYESTER PARTICLES AND METHOD FOR PRODUCING AROMATIC POLYESTER PARTICLES

(71) Applicant: SUMITOMO CHEMICAL COMPANY, LIMITED, Tokyo (JP)

(72) Inventors: Kazuyuki Ito, Tsukuba (JP); Tomohiro Sato, Tsukuba (JP); Yuzuru Saitou, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 71 days.

(21) Appl. No.: 16/621,208

(22) PCT Filed: Jun. 11, 2018

(86) PCT No.: PCT/JP2018/022204
§ 371 (c)(1),
(2) Date: Dec. 10, 2019

(87) PCT Pub. No.: WO2018/230498
PCT Pub. Date: Dec. 20, 2018

(65) Prior Publication Data
US 2020/0109238 A1    Apr. 9, 2020

(30) Foreign Application Priority Data

Jun. 13, 2017   (JP) .............................. JP2017-116066

(51) Int. Cl.
*C08G 63/181* (2006.01)
*C08G 63/06* (2006.01)
*C08J 3/12* (2006.01)

(52) U.S. Cl.
CPC .............. *C08G 63/065* (2013.01); *C08J 3/12* (2013.01)

(58) Field of Classification Search
USPC ........................................................ 521/48.5
See application file for complete search history.

(56) References Cited

U.S. PATENT DOCUMENTS

| 5,411,213 A * | 5/1995 | Just .......................... B29B 17/02 241/16 |
| 2003/0178602 A1 | 9/2003 | Okamoto et al. |
| 2007/0293633 A1 * | 12/2007 | Hosoda ................... C08L 67/00 525/390 |

(Continued)

FOREIGN PATENT DOCUMENTS

| EP | 2 151 321 A1 | 2/2010 |
| JP | 57-57713 A | 4/1982 |

(Continued)

OTHER PUBLICATIONS

International Search Report issued in corresponding International Patent Application No. PCT/JP2018/022204, dated Sep. 11, 2018, with English translation.

(Continued)

*Primary Examiner* — Terressa Boykin
(74) *Attorney, Agent, or Firm* — McDermott Will & Emery LLP (57) ABSTRACT

Aromatic polyester particles which are formed from an aromatic polyester having a flow starting temperature of 400° C. or higher and have a circularity of a projected image of 0.80 or more and 1.00 or less.

6 Claims, 2 Drawing Sheets

(56) References Cited

U.S. PATENT DOCUMENTS

| | | |
|---|---|---|
| 2008/0048150 A1 | 2/2008 | Hosoda et al. |
| 2012/0270048 A1 | 10/2012 | Saigusa et al. |
| 2014/0087086 A1 | 3/2014 | Nair et al. |

FOREIGN PATENT DOCUMENTS

| | | |
|---|---|---|
| JP | 60-025046 B2 | 6/1985 |
| JP | 02-281045 A | 11/1990 |
| JP | 2003-268121 A | 9/2003 |
| JP | 2010-031104 A | 2/2010 |
| JP | 2010-168576 A | 8/2010 |
| JP | 2012-224809 A | 11/2012 |
| JP | 2014-189730 A | 10/2014 |

OTHER PUBLICATIONS

Leon Y Sadler et al., "Attrition Mill Operating Characteristics", Powder Technology, Dec. 1, 1975 (Dec. 1, 1975), pp. 1-10.
Corrosionpedia: "Definition-What does Spheroidizing mean?", Jun. 1, 2018 (Jun. 1, 2018), pp. 1-2.
Extended European Search Report issued in corresponding European Patent Application No. 18816814.0-1102, dated Jan. 20, 2021.
Japanese Notice of Reasons for Refusal issued in corresponding Japanese Patent Application No. 2017-116066, dated Apr. 20, 2021, with English translation.

* cited by examiner

AROMATIC POLYESTER PARTICLES AND METHOD FOR PRODUCING AROMATIC POLYESTER PARTICLES

CROSS REFERENCE

This application is the U.S. National Phase under 35 U.S.C. § 371 of International Application No. PCT/JP2018/022204, filed on Jun. 11, 2018, which claims the benefit of Japanese Application No. 2017-116066, filed on Jun. 13, 2017, the entire contents of each are hereby incorporated by reference.

TECHNICAL FIELD

The present invention relates to aromatic polyester particles and a method for producing aromatic polyester particles.

Priority is claimed on Japanese Patent Application No. 2017-116066, filed Jun. 13, 2017, the content of which is incorporated herein by reference.

BACKGROUND ART

Aromatic polyesters composed from raw material monomers such as 4-hydroxybenzoic acid and 2-hydroxy-6-naphthoic acid have excellent heat resistance and wear resistance, and are known to be insoluble and infusible polymers (for example, Patent Document 1). Such insoluble and infusible aromatic polyesters are used as organic fillers for the purpose of coating metal surfaces by plasma spraying.

Patent Document 1 describes a method for producing an aromatic polyester having a narrow particle size distribution in a method for producing a polyester using 4-hydroxybenzoic acid as a main starting material. In the production method described in Patent Document 1, an aromatic polyester with less generation of fine powder can be obtained by pulverizing a polymer of 4-hydroxybenzoic acid following a heat treatment.

CITATION LIST

Patent Document

[Patent Document 1] Japanese Unexamined Patent Application, First Publication No. Sho 60-25046

SUMMARY OF INVENTION

Technical Problem

Incidentally, in order to uniformly and efficiently form a coating film in plasma spraying, it is required to stably supply a material used for plasma spraying at a constant flow rate. However, the flow rate of the aromatic polyester described in Patent Document 1 may change during plasma spraying.

The present invention has been made in view of such circumstances, with an object of providing aromatic polyester particles of which a change in flow rate is suppressed during plasma spraying and a method for producing the same.

Solution to Problem

The inventors of the present invention have conducted intensive studies and found that the fluidity of the aromatic polyester is low, which is one of the factors changing the flow rate of the aromatic polyester. Accordingly, it was considered that the aromatic polyester can be stably supplied at a constant flow rate in plasma spraying by improving the fluidity of the aromatic polyester.

As a result of intensive studies in order to solve the above problems, the inventors of the present invention have found that aromatic polyester particles having a circularity of a projected image of 0.80 or more and 1.00 or less have a high degree of fluidity.

Further, the inventors of the present invention have conducted intensive studies in order to make the circularity of the projected image of the aromatic polyester particles fall within the above range. As a result, the inventors of the present invention have found that aromatic polyester particles having a circularity of the projected image in the above range can be obtained by spheroidizing the particles by a mechanical treatment before solid phase polymerization of the aromatic polyester, thereby completing the present invention.

One aspect of the present invention provides aromatic polyester particles using an aromatic polyester having a flow starting temperature of 400° C. or higher as a forming material and having a circularity of a projected image of 0.80 or more and 1.00 or less.

In one aspect of the present invention, the aromatic polyester may be substantially composed of a repeating unit represented by the following formula (1).

$$\text{—O—Ar}^1\text{—CO—} \tag{1}$$

($Ar^1$ represents a 1,4-phenylene group, a 2,6-naphthylene group, or a 4,4'-biphenylene group.)

In one aspect of the present invention, it may be configured so that a volume average particle diameter is 30 μm or more and 100 μm or less.

One aspect of the present invention provides a method for producing aromatic polyester particles, the method including a step of producing a lumpy material of an aromatic polyester, a step of pulverizing the lumpy material, a step of spheroidizing an amorphous particle obtained in the pulverization step by a mechanical treatment, and a step of subjecting the particle obtained in the spheroidization step to solid phase polymerization.

In one aspect of the present invention, the production method may be configured so that the mechanical treatment is a compression shear treatment using a dry attrition mill.

In one aspect of the present invention, in the pulverization step, the lumpy material may be pulverized so that the volume average particle diameter of the amorphous particles is 30 μm or more and 100 μm or less.

That is, the present invention includes the following aspects.

[1] Aromatic polyester particles which are formed from an aromatic polyester having a flow starting temperature of 400° C. or higher and have a circularity of a projected image of 0.80 or more and 1.00 or less.

[2] The aromatic polyester particles according to [1], wherein the aforementioned aromatic polyester is substantially composed of a repeating unit represented by the following formula (1):

$$\text{—O—Ar}^1\text{—CO—} \tag{1}$$

($Ar^1$ represents a 1,4-phenylene group, a 2,6-naphthylene group, or a 4,4'-biphenylene group.)

[3] The aromatic polyester particles according to [1] or [2], wherein a volume average particle diameter is 30 μm or more and 100 μm or less.

[4] A method for producing aromatic polyester particles, the method including: producing a lumpy material of an aromatic polyester;

pulverizing the aforementioned lumpy material;

spheroidizing amorphous particles obtained by pulverizing the aforementioned lumpy material by a mechanical treatment; and subjecting the aforementioned spheroidized particles to solid phase polymerization.

[5] The method for producing aromatic polyester particles according to [4], wherein the aforementioned mechanical treatment is a compression shear treatment using a dry attrition mill.

[6] The method for producing aromatic polyester particles according to claim 4 or 5, wherein pulverization of the aforementioned lumpy material includes pulverizing the aforementioned lumpy material so that a volume average particle diameter of the aforementioned amorphous particles is 30 μm or more and 100 μm or less.

Advantageous Effects of Invention

According to one aspect of the present invention, there are provided aromatic polyester particles in which a change in flow rate is suppressed during plasma spraying and a method for producing the same.

DESCRIPTION OF EMBODIMENTS

<Aromatic Polyester Particles>

Aromatic polyester particles of the present embodiment use an aromatic polyester having a flow starting temperature of 400° C. or higher as a forming material and have a circularity of a projected image of 0.80 or more and 1.00 or less.

The aromatic polyester according to the aromatic polyester particles of the present embodiment is preferably substantially composed of a repeating unit represented by the following formula (1) (hereinafter sometimes referred to as "repeating unit (1)"). As a result, the aromatic polyester particles of the present embodiment are excellent in heat resistance and wear resistance.

(1)

($Ar^1$ represents a 1,4-phenylene group, a 2,6-naphthylene group, or a 4,4'-biphenylene group.)

The group represented by $Ar^1$ described above is preferably a 1,4-phenylene group or a 2,6-naphthylene group.

The term "substantially" as used herein means that a structure due to impurities or the like contained in the raw material monomer may be slightly contained.

Further, the term "substantially" as used herein means that the repeating unit (1) is contained in an amount of 90 mol % or more and 100 mol % or less, preferably 95 mol % or more and 100 mol % or less, and more preferably 98 mol % or more and 100 mol % or less, with respect to all repeating units constituting the aromatic polyester.

The aromatic polyester according to the aromatic polyester particles of the present embodiment may further include either one or both of a repeating unit represented by the following formula (2) (hereinafter referred to as "repeating unit (2)" in some cases) and a repeating unit represented by the following formula (3) (hereinafter referred to as "repeating unit (3)" in some cases) as long as the effects of the present invention are not impaired.

(2)

(3)

($Ar^2$ and $Ar^3$ each independently represent a phenylene group, a naphthylene group, a biphenylylene group or a group represented by the following formula (4); and each of hydrogen atoms in the aforementioned group represented by $Ar^2$ or $Ar^3$ may be independently substituted with a halogen atom, an alkyl group or an aryl group.)

(4)

($Ar^4$ and $Ar^5$ each independently represent a phenylene group or a naphthylene group; Z represents an oxygen atom, a sulfur atom, a carbonyl group, a sulfonyl group, or an alkylidene group; and each of hydrogen atoms in the aforementioned group represented by $Ar^4$ or $Ar^5$ may be independently substituted with a halogen atom, an alkyl group or an aryl group.)

Examples of the halogen atom include a fluorine atom, a chlorine atom, a bromine atom and an iodine atom.

The alkyl group is preferably an alkyl group having 1 to 10 carbon atoms, and examples thereof include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group.

The aryl group is preferably an aryl group having 6 to 20 carbon atoms, and examples thereof include a phenyl group, an o-tolyl group, an m-tolyl group, a p-tolyl group, a 1-naphthyl group and a 2-naphthyl group.

When the aforementioned hydrogen atom is substituted with any of these groups, the number thereof is usually 2 or less and preferably 1 or less, independently for each group represented by $Ar^1$, $Ar^2$ or $Ar^3$.

The alkylidene group is preferably an alkylidene group having 1 to 10 carbon atoms, and examples thereof include a methylene group, an ethylidene group, an isopropylidene group, an n-butylidene group and a 2-ethylhexylidene group.

When the hydrogen atom in the group represented by $Ar^4$ or $Ar^5$ is substituted with the halogen atom, the alkyl group or the aryl group, the number of groups substituting the hydrogen atom is preferably 2 or less and more preferably 1, independently for each group represented by $Ar^4$ or $Ar^5$.

In one aspect, it is more preferable that the hydrogen atom in the group represented by $Ar^1$, $Ar^2$, $Ar^3$, $Ar^4$ or $Ar^5$ is not substituted with the above groups.

The repeating unit (2) is a repeating unit derived from a predetermined aromatic dicarboxylic acid. As the repeating unit (2), those in which $Ar^2$ is a p-phenylene group (for example, a repeating unit derived from terephthalic acid), those in which $Ar^2$ is an m-phenylene group (for example, a repeating unit derived from isophthalic acid), those in which $Ar^2$ is a 2,6-naphthylene group (for example, a repeating unit derived from 2,6-naphthalenedicarboxylic acid), and those in which $Ar^2$ is a diphenyl ether-4,4'-diyl group (for example, a repeating unit derived from diphenyl ether-4,4'-dicarboxylic acid) are preferred.

The repeating unit (3) is a repeating unit derived from a predetermined aromatic diol. As the repeating unit (3), those in which $Ar^3$ is a p-phenylene group (for example, a repeating unit derived from hydroquinone), and those in which $Ar^3$ is a 4,4'-biphenylylene group (for example, a repeating unit derived from 4,4'-dihydroxybiphenyl) are preferred.

It should be noted that in the present specification, the expression "derived" means that the chemical structure is changed due to polymerization of raw material monomers, while no other structural change occurs.

The flow starting temperature of the aromatic polyester according to the present embodiment is 400° C. or higher. As a result, the aromatic polyester particles of the present embodiment are excellent in heat resistance.

It should be noted that the flow starting temperature is also referred to as flow temperature or fluidity temperature and serves as an indicator of the molecular weight of a resin, which is a temperature where a viscosity of 4,800 Pa·s (48,000 poise) is exhibited when melting a resin while raising the temperature at a rate of 4° C./min using a capillary rheometer under a load of 9.8 MPa (100 kgf/cm$^2$) and extruding it from a nozzle having an inner diameter of 1 mm and a length of 10 mm (see "Liquid Crystalline Polymer—Synthesis, Molding, and Application—" edited by Naoyuki Koide, p. 95, CMC Publishing Co., Ltd., published on Jun. 5, 1987).

In one aspect, it is taken that the "flow starting temperature of the aforementioned aromatic polyester is 400° C. or higher" when the flow of the aromatic polyester does not start at 400° C. using the measurement method described above.

It should be noted that in the present specification, the expression "aromatic polyester having a flow starting temperature of 400° C. or higher" means an aromatic polyester that does not flow at 400° C., and examples thereof include aromatic polyesters that do not start to flow at 400° C. using the above measurement method; aromatic polyesters that do not have a clear flow starting temperature but have a flow starting temperature higher than the decomposition temperature and do not flow at 400° C., or are insoluble and infusible (in other words, do not flow at 400° C.), and the like.

As the "aromatic polyester that does not have a clear flow starting temperature but has a flow starting temperature higher than the decomposition temperature and does not flow at 400° C. or is insoluble and infusible (that is, does not flow at 400° C.), for example, a polymer of 4-hydroxybenzoic acid can be mentioned.

Conventionally, aromatic polyester particles are produced by melt polymerization of raw material monomers corresponding to the repeating unit constituting the particles and solid phase polymerization of the obtained polymer (prepolymer). The aromatic polyester particles obtained in this manner may have an irregular shape.

However, fluidity may be low when amorphous aromatic polyester particles are used for plasma spraying. The inventors of the present invention have conducted intensive studies and found that the fluidity of the aromatic polyester particles is increased by spheroidizing the aromatic polyester particles.

Here, the circularity of a two-dimensional particle projection image is known as one of the indices indicating the degree of sphericity of particles. Hereinafter, the "particle projection image" may be simply referred to as "projected image". The closer the degree of circularity of the projected image is to 1, the more the projected image is a perfect circle. The aromatic polyester particles of the present embodiment have a circularity of a projected image of 0.80 or more and 1.00 or less.

The aromatic polyester particles of the present embodiment preferably have a circularity of a projected image of 0.82 or more and 1.00 or less, and more preferably 0.84 or more and 1.00 or less.

The aromatic polyester particles of the present embodiment preferably contain, among the entire particles, 45% or more and 100% or less, more preferably 60% or more and 100% or less, and still more preferably 70% or more and 100% or less, of particles having a circularity of a projected image of 0.80 or more.

The circularity of the projected image of the aromatic polyester particles in the present embodiment can be calculated as follows.

First, a SEM image of the aromatic polyester particles is taken to obtain a particle image serving as a projected image of the aromatic polyester particles. Next, circularity values for the particle images of 100 randomly sampled aromatic polyester particles are determined based on the following formula (S1), respectively, and the average value thereof is taken as the circularity.

$$\text{Circularity} = 4\pi \times (\text{area of particle image})/(\text{circumference of a circle having the same area as that of the particle image})^2 \quad (S1)$$

The calculation of the circularity can be performed using, for example, image analysis software ("WinROOF" manufactured by Mitani Corporation).

In addition, the ratio of the particles having a circularity of the projected image of 0.80 or more with respect to the entire particles is obtained by dividing the number of particles having a circularity of the projected image of 0.80 or more by 100, which is the total number of the imaged particles, and by expressing the obtained value in percentage.

According to the study by the inventors of the present invention, it has become clear that the fluidity of the aromatic polyester particles becomes high when the circularity of the projected image of the aromatic polyester particles in the present embodiment is in the range of 0.80 or more and 1.00 or less.

The fluidity of the aromatic polyester particles in the present embodiment is confirmed by using a glass tube (disposable pipette (borosilicate glass): 3 mL, manufactured by Maruemu Corporation) connected to a funnel and charging about 3 g of aromatic polyester particles into the glass tube from above the funnel all at once.

In the evaluation of fluidity described above, when the fluidity of the aromatic polyester particles is high, a portion blocked by the aromatic polyester particles is not observed in the glass tube, and all the aromatic polyester particles pass therethrough. On the other hand, when the fluidity of the aromatic polyester particles is low, a portion blocked by the aromatic polyester particles is observed in the glass tube, and the aromatic polyester particles remain in the glass tube.

According to the study by the inventors of the present invention, it has become clear that the strength of the aromatic polyester particles becomes high when the circularity of the projected image of the aromatic polyester particles in the present embodiment is in the range of 0.80 or more and 1.00 or less. When the circularity of the projected image of the aromatic polyester particles in the present embodiment is 0.80 or more, the projected image of the aromatic polyester particles is sufficiently close to a perfect circle. In such aromatic polyester particles, it is presumed that stress is easily dispersed. As a result, it is presumed that the strength of the aromatic polyester particles is increased.

Further, if the strength of the aromatic polyester particles is high, when the aromatic polyester particles are used for plasma spraying, it is presumed that the aromatic polyester particles are less susceptible to crushing inside the plasma spraying device. Therefore, the fine powder of the aromatic polyester which is considered as one of the causes of the decrease in the fluidity of the aromatic polyester particles is hardly generated inside the plasma spraying device. As a result, it is presumed that aromatic polyester particles having a circularity of the projected image of 0.80 or more and 1.00 or less can maintain a high degree of fluidity.

For example, the strength of the aromatic polyester particles is preferably 16 MPa or more and 50 MPa or less, and more preferably 18 MPa or more and 30 MPa or less.

The strength of the aromatic polyester particles in the present embodiment can be obtained by a method described in Examples described later using a microcompression tester ("MCT-510" manufactured by Shimadzu Corporation).

The volume average particle diameter of the aromatic polyester particles of the present embodiment is preferably 30 μm or more and 100 μm or less. When the volume average particle diameter of the aromatic polyester particles is 30 μm or more, a degree of fluidity more suitable for use in plasma spraying can be exhibited. When the volume average particle diameter of the aromatic polyester particles is 100 μm or less, a more uniform sprayed coating can be formed when plasma spraying is performed.

The volume average particle diameter of the aromatic polyester particles of the present embodiment is more preferably 50 μm or more, and still more preferably 60 μm or more. Further, the volume average particle diameter of the aromatic polyester particles of the present embodiment is more preferably 95 μm or less, and still more preferably 90 μm or less.

In one aspect, the volume average particle diameter of the aromatic polyester particles of the present embodiment is preferably 30 μm or more and 100 μm or less, more preferably 50 μm or more and 95 μm or less, still more preferably 60 μm or more and 90 μm or less, particularly preferably 60 μm or more and 80 μm or less, and extremely preferably 67 μm or more and 80 μm or less.

Based on the cumulative volume distribution diagram of the particle size distribution of the aromatic polyester particles in the present embodiment, the particle diameter at a cumulative percentage of 10% from the small diameter side (hereinafter sometimes abbreviated as D10) is preferably 20 μm or more, and more preferably 30 μm or more. D10 of the aromatic polyester particles in the present embodiment is preferably 60 μm or less, and more preferably 50 μm or less.

In one aspect, D10 of the aromatic polyester particles in the present embodiment is preferably 20 μm or more and 60 μm or less, and more preferably 30 μm or more and 50 μm or less.

Based on the cumulative volume distribution diagram of the particle size distribution of the aromatic polyester particles in the present embodiment, the particle diameter at a cumulative percentage of 90% from the small diameter side (hereinafter sometimes abbreviated as D90) is preferably 80 μm or more, and more preferably 90 μm or more. D90 of the aromatic polyester particles in the present embodiment is preferably 150 μm or less, and more preferably 130 μm or less.

In one aspect, D90 of the aromatic polyester particles in the present embodiment is preferably 80 μm or more and 150 μm or less, more preferably 90 μm or more and 130 μm or less, and particularly preferably 100 μm or more and 110 μm or less.

The value of D90/D10 in the aromatic polyester particles of the present embodiment is preferably 1 or more and 3 or less, and more preferably 1 or more and 2.5 or less. When the value of D90/D10 in the aromatic polyester particles of the present embodiment is 3 or less, the particle size distribution of the aromatic polyester particles is sufficiently narrow, and the aromatic polyester particles exhibit a high degree of fluidity.

The upper limit value and lower limit value of the volume average particle diameter, the upper limit value and lower limit value of D10 and the upper limit value and lower limit value of D90 of the aromatic polyester particles in the present embodiment can be arbitrarily combined, respectively.

The volume average particle diameter, D10 and D90 of the aromatic polyester particles in the present embodiment can be respectively determined in the following manner.

First, about 100 mg of aromatic polyester particles are dispersed in water. Next, a particle size distribution of the aromatic polyester particles is obtained for the obtained dispersion liquid using a laser diffraction/scattering type particle size distribution measuring device ("LA-950" manufactured by Horiba, Ltd.). Based on the cumulative volume distribution diagram of the particle size distribution of the obtained aromatic polyester particles, the volume average particle diameter is calculated by measuring the particle diameter at a cumulative percentage of 50% from the small diameter side. In the same manner, the particle diameter at a cumulative percentage of 10% (D10) and the particle diameter at a cumulative percentage of 90% (D90) from the small diameter side are calculated.

According to the present embodiment, aromatic polyester particles in which a change in flow rate during plasma spraying is suppressed are provided.

<Method for Producing Aromatic Polyester Particles>

A method for producing aromatic polyester particles in the present embodiment includes: melt polymerization of a raw material monomer to produce a lumpy material of a low molecular weight aromatic polyester (lumpy material production step); pulverization of the obtained lumpy material of the low molecular weight aromatic polyester (pulverization step); spheroidization of amorphous particles obtained by pulverization of the aforementioned lumpy material by a mechanical treatment (spheroidization step); and solid phase polymerization of the aforementioned spheroidized particles (solid phase polymerization step).

It should be noted that the molecular weight of the aromatic polyester inevitably increases before and after the "solid phase polymerization step". In this sense, the term "low molecular weight" means that the molecular weight is relatively lower than that of the aromatic polyester obtained in the solid phase polymerization step.

In one aspect, due to the solid phase polymerization step, particles having a flow starting temperature of less than 400° C. that have been spheroidized in the aforementioned spheroidization step become aromatic polyester particles having a flow starting temperature of 400° C. or higher.

The step of producing a lumpy material in the present embodiment includes melt polymerization of a raw material monomer corresponding to the repeating unit (1). Examples of the raw material monomer corresponding to the repeating unit (1) include 4-hydroxybenzoic acid, 2-hydroxy-6-naphthoic acid and 4-hydroxy-4'-carboxybiphenyl.

As the raw material monomer for the step of producing a lumpy material in the present embodiment, 4-hydroxybenzoic acid or 2-hydroxy-6-naphthoic acid is preferable, and 4-hydroxybenzoic acid is more preferable.

In addition, the raw material monomer according to the present embodiment may be a compound in which either one or both of the phenolic hydroxyl group and the carboxyl group of the above monomer is modified with a group highly reactive in transesterification reactions.

As the highly reactive group described above, an acyl group is preferable.

In one aspect, as the raw material monomer for the step of producing a lumpy material in the present embodiment, compounds represented by the following formula (2) are preferable. Among the compounds represented by the following formula (2), 4-acetoxybenzoic acid is preferable because of its relatively high reactivity.

$$RCOO-Ar^1-COOH \quad (2)$$

(In the formula, R represents a methyl group, an ethyl group, an n-propyl group, or an isopropyl group; and $Ar^1$ is the same as defined in the above formula (1).)

In the method for producing aromatic polyester particles in the present embodiment, a copolymerizable monomer may be further used as a raw material monomer as long as the effects of the present invention are not impaired. Examples of the copolymerizable monomer include aromatic dicarboxylic acids, aromatic diols, and esters of aromatic dicarboxylic acids and aromatic diols.

In the step of producing a lumpy material of the present embodiment, it is preferable to use only one type of raw material monomer. As a result, aromatic polyester particles excellent in heat resistance and wear resistance can be obtained.

In the step of producing a lumpy material of the present embodiment, the above raw material monomers are polymerized under a high shear condition at 250 to 370° C. in a system that does not substantially contain a solvent. In this case, the polymerization system changes from a molten state to a solid state under a condition of 250 to 370° C. as the polymerization reaction proceeds. The aromatic polyester obtained in this manner corresponds to "low molecular weight aromatic polyester (that is, an aromatic polyester having a relatively lower molecular weight than that of the aromatic polyester obtained in the solid phase polymerization step)" in the present specification. Further, the obtained lumpy material of the aromatic polyester is a powder.

The pulverization step in the present embodiment includes pulverization of the lumpy material of the aromatic polyester obtained in the aforementioned lumpy material production step.

In the pulverization step in the present embodiment, it is possible to pulverize using impact compression type pulverizers such as a hammer mill, a pin mill and a ball mill, compression type pulverizers such as a roll crusher and a disk crusher, friction grinding type pulverizers such as a ring roller mill, vibration type pulverizers such as a vibration mill, and pulverizers such as a jet mill and a colloid mill.

In the pulverization step in the present embodiment, it is preferable to pulverize the aforementioned lumpy material of the aromatic polyester using the above pulverizer so that the volume average particle diameter of the obtained amorphous particles is 30 μm or more and 100 μm or less. As a result, it is easy to control the volume average particle diameter of the ultimately obtained aromatic polyester particles.

That is, in one aspect, the pulverization step in the present embodiment includes pulverizing the aforementioned lumpy material of the aromatic polyester so that the volume average particle diameter of the obtained amorphous particles is 30 μm or more and 100 μm or less.

In the pulverization step in the present embodiment, in order to set the volume average particle diameter of the obtained amorphous particles to 30 μm or more and 100 μm or less, for example, the rotational speed of the above pulverizer, the pulverization time, and the supply rate of the above lumpy material may be adjusted.

The spheroidization step in the present embodiment includes spheroidization of the amorphous particles obtained in the aforementioned pulverization step by a mechanical treatment. As a result, the circularity of the projected image of the ultimately obtained aromatic polyester particles can be set to 0.80 or more and 1.00 or less.

In the spheroidization step in the present embodiment, the mechanical treatment is preferably a treatment by a high-speed air flow impact method or a compression shear treatment using a dry attrition mill. In particular, it is preferable that the mechanical treatment in the spheroidization step in the present embodiment is a compression shear treatment using a dry attrition mill.

In the spheroidization step in the present embodiment, treatment conditions of the above mechanical treatment may be set by preliminary experiments so that the circularity of the projected image of the aromatic polyester particles is 0.80 or more and 1.00 or less.

In one aspect, the spheroidization step in the present embodiment includes spheroidization of the amorphous particles obtained in the aforementioned pulverization step by a mechanical treatment; wherein the aforementioned mechanical treatment is a treatment by a high-speed air flow impact method or a compression shear treatment using a dry attrition mill, and preferably a compression shear treatment using a dry attrition mill; and the aforementioned spheroidization means that the circularity of the projected image of the aromatic polyester particles obtained by the aforementioned mechanical treatment becomes 0.80 or more and 1.00 or less.

The solid phase polymerization step in the present embodiment includes solid phase polymerization of the particles obtained in the aforementioned spheroidization step.

In the solid phase polymerization step in the present embodiment, polymerization is conducted in a solid phase at 250° C. to 400° C. under the flow of an inert gas (for example, nitrogen) or air.

In one aspect, the solid phase polymerization step in the present embodiment includes solid phase polymerization of the particles obtained in the aforementioned spheroidization step;

wherein the aforementioned solid phase polymerization is polymerization conducted in a solid phase at 250° C. to 400° C. under the flow of an inert gas or air.

In another aspect, the solid phase polymerization step in the present embodiment includes solid phase polymerization of particles having a flow starting temperature of less than 400° C. which have been spheroidized in the aforementioned spheroidization step so as to produce aromatic polyester particles having a flow starting temperature of 400° C. or higher.

In the production method of the present embodiment, it is considered that the volume average particle diameter of the particles does not substantially change during the spheroidization step and the solid phase polymerization step.

Here, the expression "volume average particle diameter of the particles does not substantially change" means that the volume average particle diameter of the particles does not change to an extent so as to adversely affect the physical properties.

According to the present embodiment, there is provided a method for producing aromatic polyester particles capable of producing aromatic polyester particles in which a change in flow rate during plasma spraying is suppressed.

In one aspect, the aromatic polyester particles according to an embodiment of the present invention are:

aromatic polyester particles which are formed from an aromatic polyester having a flow starting temperature of 400° C. or higher;

wherein the aforementioned aromatic polyester is substantially composed of a repeating unit represented by the above formula (1), preferably a repeating unit derived from 4-hydroxybenzoic acid or 2-hydroxy-6-naphthoic acid, and more preferably a repeating unit derived from 4-hydroxybenzoic acid;

the circularity of the projected image is 0.80 or more and 1.00 or less, preferably 0.82 or more and 1.00 or less, and more preferably 0.84 or more and 1.00 or less;

the volume average particle diameter is 30 μm or more and 100 μm or less, preferably 50 μm or more and 95 μm or less, more preferably 60 μm or more and 90 μm or less, particularly preferably 60 μm or more and 80 μm or less, and extremely preferably 67 μm or more and 80 μm or less.

In one aspect, the method for producing aromatic polyester particles according to an embodiment of the present invention is a method for producing aromatic polyester particles, the method including:

producing a lumpy material of an aromatic polyester;

pulverizing the aforementioned lumpy material;

spheroidizing amorphous particles obtained by pulverizing the aforementioned lumpy material by a mechanical treatment; and solid phase polymerization of the aforementioned spheroidized particles, wherein production of the aforementioned lumpy material includes melt polymerization of a raw material monomer corresponding to the above repeating unit (1), preferably melt polymerization of 4-hydroxybenzoic acid, 2-hydroxy-6-naphthoic acid or 4-hydroxy-4'-carboxybiphenyl, more preferably melt polymerization of 4-hydroxybenzoic acid or 2-hydroxy-6-naphthoic acid, and still more preferably melt polymerization of 4-hydroxybenzoic acid;

the aforementioned melt polymerization is polymerization conducted under a high shear condition at 250 to 370° C. in a system that does not contain a solvent;

the lumpy material of aromatic polyester produced by the aforementioned melt polymerization is a powder;

the volume average particle diameter of the amorphous particles obtained by the aforementioned pulverization is 30 μm or more and 100 μm or less;

the aforementioned mechanical treatment is a treatment by a high-speed air flow impact method or a compression shear treatment using a dry attrition mill, and preferably a compression shear treatment using a dry attrition mill;

the aforementioned spheroidization means that the circularity of the projected image of the aromatic polyester particles obtained by the aforementioned mechanical treatment becomes 0.80 or more and 1.00 or less; and the aforementioned solid phase polymerization is conducted in a solid phase at 250° C. to 400° C. under the flow of an inert gas or air.

EXAMPLES

The present invention will be described below based on examples. However, the present invention is not limited to these examples. Each measurement was performed as follows.

[Flow Starting Temperature of Aromatic Polyester]

The flow starting temperature of an aromatic polyester was measured using a flow characteristic evaluation apparatus ("Flowtester Model CFT-500" manufactured by Shimadzu Corporation).

First, about 2 g of an aromatic polyester is filled into a capillary rheometer equipped with a die having an inner diameter of 1 mm and a length of 10 mm. Next, a liquid crystalline polyester was melted and extruded from a nozzle while raising the temperature at a rate of 4° C./min under a load of 9.8 MPa (100 kgf/cm$^2$). At this time, a temperature at which the melt viscosity was 4,800 Pa·s (48,000 poise) was measured, and this was used as the flow starting temperature.

In the present example, it was taken that the "flow starting temperature of the aforementioned aromatic polyester was 400° C. or higher" when the flow of the aromatic polyester did not start at 400° C. using the measurement method described above.

[Circularity of the Projected Image of Aromatic Polyester Particles]

First, an extremely small amount of aromatic polyester particles was added to ethanol, and a suspension was prepared using an ultrasonic cleaner. Next, the suspension was dropped onto an aluminum foil using a dropper and thinly extended, and ethanol was then evaporated. Next, Pt—Pd was deposited on the aromatic polyester particles on the aluminum foil to obtain a sample for SEM observation.

Next, the sample was photographed using a field emission scanning electron microscope ("S4800" manufactured by Hitachi High-Technologies Corporation) under the conditions of an accelerating voltage of 2 kV and a magnification of 500 times.

Next, using the SEM image of the aromatic polyester particles, the circularity of the image of the aromatic polyester particles was calculated based on the following formula (S1) using image analysis software ("WinROOF" manufactured by Mitani Corporation). Using the above-mentioned image analysis software, circularity values for the particle images of 100 randomly sampled aromatic polyester particles were determined, and the average value thereof was calculated.

Circularity=4π×(area of particle image)/(circumference of a circle having the same area as that of the particle image)    (S1)

By adopting the above method, the aromatic polyester particles are unlikely to aggregate with each other, and a SEM image in which each particle is independent can be easily obtained. For example, even if the aromatic polyester particles are adjacent to each other in the SEM image, the individual particles are analyzed one by one when they can be distinguished respectively as independent particles. On the other hand, when the aromatic polyester particles overlapped with each other and could not be distinguished respectively as independent particles in the SEM image, only the particle located at the top was analyzed, and the other particles were not analyzed.

In the present example, when the circularity of the projected image of the aromatic polyester particles is 1, the projected image of the aromatic polyester particles is a perfect circle. Further, it becomes a distorted circle as the circularity of the projected image of the aromatic polyester particles becomes more distant from 1.

[Volume Average Particle Diameter, D10 and D90 of Aromatic Polyester Particles]

First, about 100 mg of aromatic polyester particles were dispersed in water. Next, a particle size distribution of the aromatic polyester particles was obtained for the obtained dispersion liquid using a laser diffraction/scattering type particle size distribution measuring device ("LA-950" manufactured by Horiba, Ltd.). Based on the cumulative volume distribution diagram of the particle size distribution of the obtained aromatic polyester particles, the volume average particle diameter was calculated by measuring the particle diameter at a cumulative percentage of 50% from the small diameter side. In the same manner, the particle diameter at a cumulative percentage of 10% (D10) and the particle diameter at a cumulative percentage of 90% (D90) from the small diameter side were calculated.

Production Example

After sufficiently replacing the inside of a reactor equipped with a stirrer, a torque meter, a nitrogen gas inlet tube, a thermometer and a reflux condenser with nitrogen gas, 70.0 parts by mass of 4-hydroxybenzoic acid and 58.3 parts by mass of acetic anhydride were charged into the reactor, and the temperature was slowly raised until the internal temperature reached 140° C., followed by stirring for 3 hours. The temperature was further raised to 300° C. over about 2 hours, and then the reaction product was cooled to obtain an aromatic polyester prepolymer (lumpy material of aromatic polyester) (lumpy material production step).

The obtained prepolymer was pulverized with a pulverizer to obtain amorphous particles of the aromatic polyester (pulverization step). The obtained amorphous particles had a volume average particle diameter of 52 μm, a D10 of 7 μm, and a D90 of 104 μm.

Example 1

The amorphous particles of aromatic polyester obtained in the production example were subjected to a spheroidization treatment by using a dry attrition mill ("Nobilta" manufactured by Hosokawa Micron Corporation) to appropriately adjust the rotational speed and operating time of the rotor (spheroidization step). The spheroidized particles had a volume average particle diameter of 63 μm, a D10 of 24 μm, a D90 of 107 μm, and a circularity of 0.85.

Next, the particles obtained in the spheroidization step were heated from room temperature (23° C.) to 370° C. over 9 hours in a nitrogen gas atmosphere, and further maintained at 370° C. for 5 hours, thereby being subjected to solid phase polymerization (solid phase polymerization step).

Next, the product following the solid phase polymerization was cooled to room temperature to obtain aromatic polyester particles.

Figure 1:
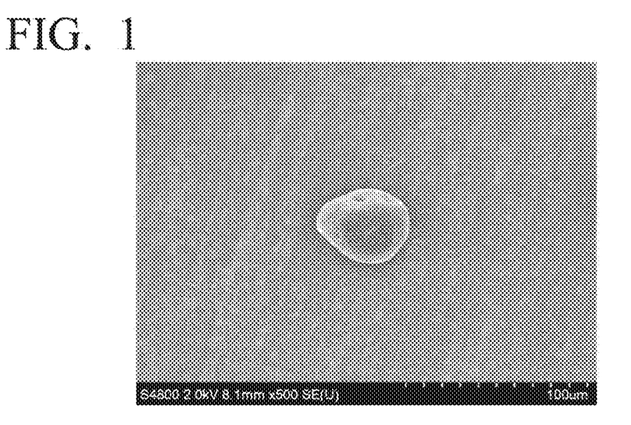
FIG. 1 is a SEM image of an aromatic polyester particle of Example 1.

FIG. 1 is a SEM image of an aromatic polyester particle of Example 1. The obtained aromatic polyester particles had a flow starting temperature of 400° C. or higher, a volume average particle diameter of 67 μm, a D10 of 32 μm, a D90 of 102 μm, and a circularity of 0.84.

Comparative Example 1

The amorphous particles of aromatic polyester obtained in the production example were heated from room temperature to 370° C. over 9 hours in a nitrogen gas atmosphere, and further maintained at 370° C. for 5 hours, thereby being subjected to solid phase polymerization (solid phase polymerization step).

Next, the product following the solid phase polymerization was cooled to room temperature to obtain an aromatic polyester in the form of a powder.

The flow starting temperature of the obtained powdered aromatic polyester was 400° C. or higher. Moreover, aromatic polyester particles were obtained by classifying the obtained powdered aromatic polyester.

Figure 2:
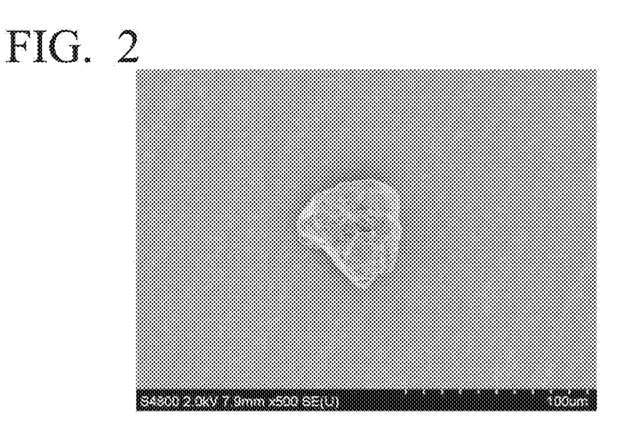
FIG. 2 is a SEM image of an aromatic polyester particle of Comparative Example 1.

FIG. 2 is a SEM image of an aromatic polyester particle of Comparative Example 1. The obtained aromatic polyester particles had a volume average particle diameter of 83 μm, a D10 of 56 μm, a D90 of 129 μm, and a circularity of 0.74.

Comparative Example 2

Figure 3:
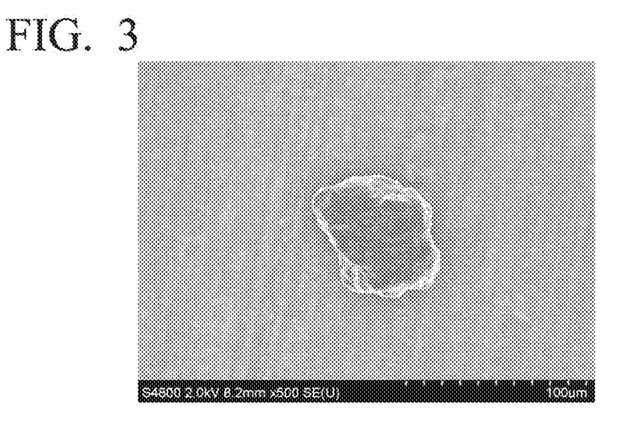
FIG. 3 is a SEM image of an aromatic polyester particle of Comparative Example 2.

The aromatic polyester particles obtained in Comparative Example 1 were subjected to a spheroidization treatment under the same conditions as in Example 1 using a dry attrition mill ("Nobilta" manufactured by Hosokawa Micron Corporation) to obtain aromatic polyester particles. FIG. 3 is a SEM image of an aromatic polyester particle of Comparative Example 2. The obtained aromatic polyester particles had a flow starting temperature of 400° C. or higher, a volume average particle diameter of 81 μm, a D10 of 54 μm, a D90 of 111 μm, and a circularity of 0.78.

The following evaluation was performed on the aromatic polyester particles of Example 1, Comparative Example 1 and Comparative Example 2. The evaluation results are shown in Table 1.

<Evaluation>

[Strength of Aromatic Polyester Particles]

The strength of the aromatic polyester particles was measured using a microcompression tester ("MCT-510" manufactured by Shimadzu Corporation).

Figure 4:
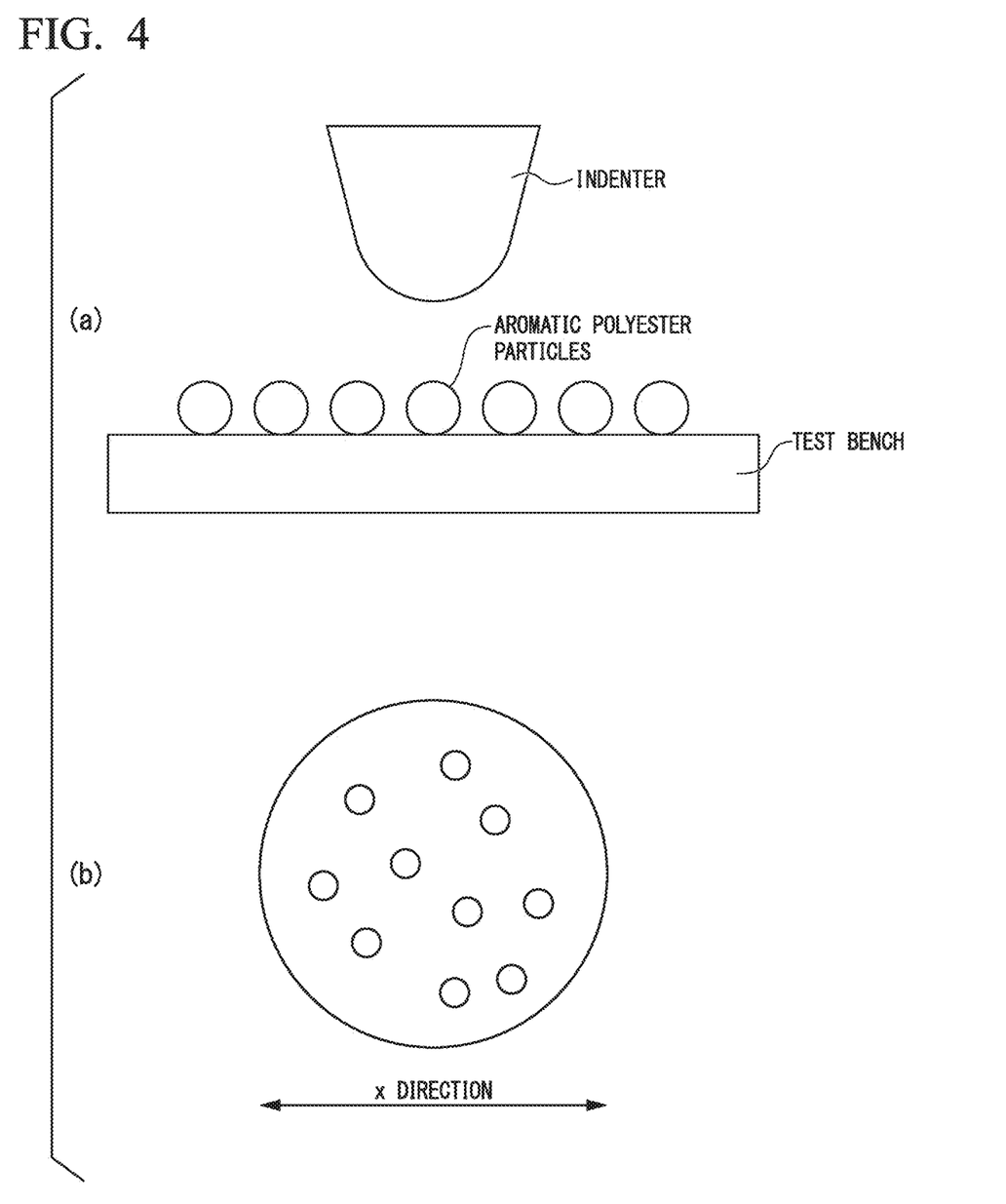
FIG. 4 is a diagram showing a method for measuring the strength of aromatic polyester particles in Examples.

FIG. 4 is a diagram showing a method for measuring the strength of the aromatic polyester particles in the present example, where (a) shows a front view, and (b) shows a plan view. As shown in FIG. 4, first, an extremely small amount of sample (aromatic polyester particles) was sprayed onto the test bench. Next, a particle having a particle diameter in the range of 70±5 μm was selected by a microscope, an indenter (plane φ: 200 μm) was applied to the aromatic polyester particle whose particle diameter was confirmed along the normal direction of the test bench, and the aromatic polyester particles were subjected to a compression test one by one under the following measurement conditions. Further, the test force when the particle diameter of aromatic polyester particle was displaced by 10% in the x direction in FIG. 4 was measured.

[Measurement Conditions]

Test force: 490.0 mN

Loading rate: 4.8420 mN/sec

Next, the stress when the particle diameter of the aromatic polyester particle was displaced by 10% in the x direction in FIG. 4 (10% strength) was calculated based on the following formula (S2). Similarly, 10% strength values were obtained for 5 or 10 aromatic polyester particles, and the average value thereof was calculated.

$$C(x) = 2.48 P/\pi d^2 \quad (S2)$$

(In the formula (S2), C(x) represents 10% strength (MPa), P represents a test force (N) when the particle diameter of the aromatic polyester particle is displaced by 10%, and d represents the particle diameter (mm) of the aromatic polyester particle.)

[Fluidity of Aromatic Polyester Particles]

Using a glass tube (disposable pipette (borosilicate glass): 3 mL, manufactured by Maruemu Corporation) connected to a funnel, about 3 g of aromatic polyester particles were charged into the glass tube from above the funnel all at once. This test was performed twice.

In this test, when a portion blocked by the aromatic polyester particles was not observed in the glass tube in both two tests and all the aromatic polyester particles passed therethrough, the case was evaluated as "satisfactory". In addition, when a portion blocked by the aromatic polyester particles was observed in the glass tube in both two tests and the aromatic polyester particles remained in the glass tube, the fluidity of the aromatic polyester particles was evaluated as "poor".

The symbol "-" in Table 1 represents unmeasured values.

TABLE

|  | Ex. 1 | Comp. Ex. 1 | Comp. Ex. 2 |
|---|---|---|---|
| Spheroidization treatment | Between pulverization step and solid phase polymerization step | None | After solid phase polymerization step |
| Flow starting temperature (° C.) | ≥400 | ≥400 | ≥400 |
| Volume average particle diameter (μm) | 67 | 83 | 81 |
| D10 (μm) | 32 | 56 | 54 |
| D90 (μm) | 102 | 129 | 111 |
| Circularity | 0.84 | 0.74 | 0.78 |
| Fluidity | Satisfactory | Poor | — |
| 10% strength (MPa) | 18.5 | 15.3 | — |

As shown in Table 1, the aromatic polyester particles of Comparative Example 1 produced by a conventional production method with no spheroidization treatment had a circularity of the projected image of less than 0.80. On the other hand, in Example 1 to which the production method of the present invention was applied, it was possible to obtain aromatic polyester particles having a circularity of a projected image of 0.80 or more and 1.00 or less by performing a spheroidization treatment during a period after pulverization and before solid phase polymerization. Moreover, in Example 1, it was possible to make the 10% strength of the aromatic polyester particle high, as compared with Comparative Example 1.

On the other hand, in Comparative Example 2 in which a spheroidization treatment was performed after solid phase polymerization, the circularity of the projected image of the aromatic polyester particles was only slightly improved, as compared with Comparative Example 1, and was less than 0.80.

The aromatic polyester particles of Example 1 having a circularity of a projected image of 0.80 or more and 1.00 or less exhibited a high degree of fluidity. From this result, when using the aromatic polyester particles of Example 1 for plasma spraying, it is presumed that it is possible to suppress the aromatic polyester particles from crushing inside the plasma spraying device. As a result, it is presumed that generation of a fine powder of aromatic polyester inside the plasma spraying device can be suppressed, and a high degree of fluidity can be maintained.

From the above results, it was confirmed that the present invention is useful.

INDUSTRIAL APPLICABILITY

Since the present invention can provide aromatic polyester particles in which a change in flow rate during plasma spraying is suppressed and a method for producing the same, it is extremely useful industrially.

The invention claimed is:

1. Aromatic polyester particles which are formed from an aromatic polyester having a flow starting temperature of 400° C. or higher and have a circularity of a projected image of 0.80 or more and 1.00 or less.

2. The aromatic polyester particles according to claim 1, wherein said aromatic polyester is composed of a repeating unit represented by the following formula (1):

$$-O-Ar^1-CO- \quad (1)$$

(Ar$^1$ represents a 1,4-phenylene group, a 2,6-naphthylene group, or a 4,4'-biphenylene group),
wherein the repeating unit is contained in an amount of 90 mol % or more and 100 mol % or less with respect to all repeating units constituting the aromatic polyester.

3. The aromatic polyester particles according to claim 1, wherein a volume average particle diameter is 30 μm or more and 100 μm or less.

4. A method for producing aromatic polyester particles according to claim 1,
the method comprising:
producing a lumpy material of an aromatic polyester;
pulverizing said lumpy material;
spheroidizing amorphous particles obtained by pulverizing said lumpy material by a mechanical treatment; and
subjecting said spheroidized particles to solid phase polymerization.

5. The method for producing aromatic polyester particles according to claim 4, wherein said mechanical treatment is a compression shear treatment using a dry attrition mill.

6. The method for producing aromatic polyester particles according to claim 4, wherein in pulverization of said lumpy material, said lumpy material is pulverized so that a volume average particle diameter of said amorphous particles is 30 μm or more and 100 μm or less.

* * * * *